(12) United States Patent
Bennison

(10) Patent No.: US 7,321,421 B2
(45) Date of Patent: Jan. 22, 2008

(54) APPARATUS AND METHODS FOR SCANNING CONOSCOPIC HOLOGRAPHY MEASUREMENTS

(75) Inventor: Stephen J. Bennison, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 370 days.

(21) Appl. No.: 10/903,332

(22) Filed: Jul. 30, 2004

(65) Prior Publication Data

US 2006/0023223 A1    Feb. 2, 2006

(51) Int. Cl.
*G01N 21/00* (2006.01)

(52) U.S. Cl. .............. 356/237.1; 356/237.6; 356/445; 356/614

(58) Field of Classification Search .. 356/237.1–237.6, 356/243.1, 243.4, 243.8, 614–623, 445; 360/600; 359/1, 22, 30, 26, 27, 495
See application file for complete search history.

(56) References Cited

U.S. PATENT DOCUMENTS

| | | | |
|---|---|---|---|
| 4,707,128 A * | 11/1987 | Coles | 356/5.04 |
| 5,111,513 A * | 5/1992 | Turner et al. | 382/100 |
| 5,291,314 A | 3/1994 | Agranat et al. | |
| 5,453,969 A | 9/1995 | Psaltis et al. | |
| 5,615,013 A * | 3/1997 | Rueb et al. | 356/394 |
| 5,909,270 A | 6/1999 | Moser et al. | |
| 5,926,295 A | 7/1999 | Charlot et al. | |
| 5,953,137 A * | 9/1999 | Sirat et al. | 359/30 |
| 6,424,437 B1 | 7/2002 | Popovich | |
| 6,473,209 B1 | 10/2002 | Popovich | |
| 6,678,078 B1 | 1/2004 | Popovich et al. | |
| 6,720,567 B2 * | 4/2004 | Fordahl et al. | 250/559.29 |
| 2006/0074509 A1* | 4/2006 | Di Fabrizio et al. | 700/117 |

* cited by examiner

*Primary Examiner*—Hoa Q. Pham
(74) *Attorney, Agent, or Firm*—Lee & Hayes, PLLC

(57) ABSTRACT

Apparatus and methods for scanning conoscopic holography measurements are disclosed. In one embodiment, a system includes a conoscopic holography sensor, a beam directing assembly, and a control assembly. The beam directing assembly is adapted to adjustably direct a laser beam from the sensor toward the workpiece, and to direct a reflected light from the workpiece into the sensor. The control assembly controllably adjusts a direction of the laser beam into a desired position on the workpiece. In one particular embodiment, the beam directing assembly includes first and second mirrors coupled to first and second galvanometers for controllably directing the laser beam along first and second axes, respectively. Alternately, the system includes a calibration assembly having a three axis stage for performing calibrations of the laser beam location.

33 Claims, 7 Drawing Sheets

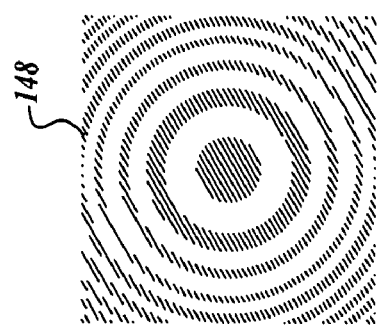
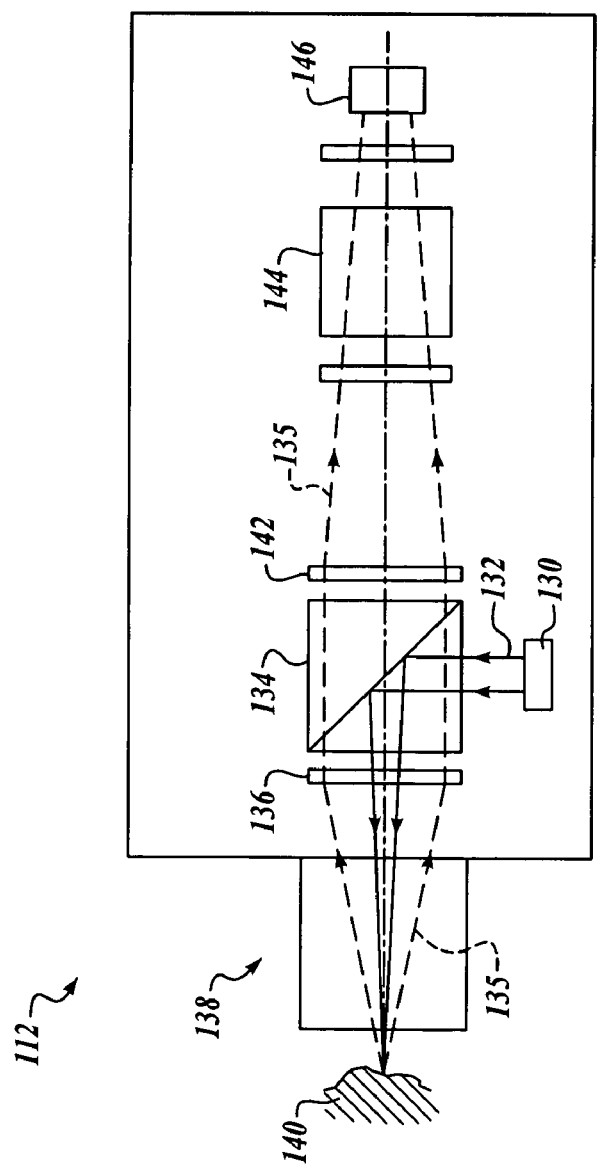
FIG.5B
FIG.5A

APPARATUS AND METHODS FOR SCANNING CONOSCOPIC HOLOGRAPHY MEASUREMENTS

FIELD OF THE INVENTION

This invention relates to measurement systems, and more specifically, to scanning conoscopic holography measurement systems.

BACKGROUND OF THE INVENTION

Conventional manufacturing and assembly of large, complex structures, such as large commercial aircraft and the like, may involve hundreds of single purpose measurement gauges. Each such measurement gauge typically has a specific function, and when a new function is required, a new measurement gauge is designed and fabricated.

In addition, many conventional measurement gauges include an assumption about some aspect of the inspected feature's geometry. For example, a countersink diameter gauge may be based on an assumption that the hole is round, and that there are no chamfers at the edge where the conical stylus of the gauge makes contact. Such gauges typically provide accurate measurements provided that these assumptions are satisfied.

Although desirable results have been achieved using prior art measurement systems, there is room for improvement. For example, in some circumstances, the assumptions included in the operation of a measurement gauge may cause measurement errors that are unacceptable. Furthermore, because the prior art measurement gauges are specialized to a particular purpose, a large number of such gauges may be needed, adding to the overall cost and complexity of the manufacturing and assembly process. Therefore, a generic measurement system capable of acquiring a variety of different measurements without the risk of assumptive errors would be useful.

SUMMARY OF THE INVENTION

The present invention is directed to measurement systems, and more specifically, to scanning conoscopic holography measurement systems. Embodiments of apparatus and methods in accordance with the present invention may advantageously reduce the number of measurement gauges that would otherwise be needed in the manufacturing and assembly of large, complex structures, and may reduce or eliminate the errors that may occur due to assumptions inherent in the measurement procedure.

In one embodiment, a system for performing a measurement of a physical characteristic of a workpiece includes a conoscopic holography sensor, a beam directing assembly, and a control assembly. The conoscopic holography sensor is adapted to emit a laser beam, and the beam directing assembly is adapted to receive the laser beam and to adjustably direct the laser beam toward the workpiece. The beam directing assembly is further adapted to receive reflected light back from the workpiece and to direct the reflected light toward the conoscopic holography sensor. The control assembly controls the timing of the emission of the laser beam and its direction, each of which is adjustable independently to effect the desired scanning measurement.

In one particular embodiment, the beam directing assembly includes a first mirror operatively coupled to a first galvanometer and being controllably adjustable to direct the laser beam along a first axis, and a second mirror operatively coupled to a second galvanometer and being controllably adjustable to direct the laser beam along a second axis.

In another alternate embodiment, the system further includes a calibration assembly operatively coupled to at least one of the conoscopic holography sensor and the beam directing assembly. The calibration assembly includes a positioning assembly, a camera, and a processor. The positioning assembly has a carriage operatively coupled to at least one of the conoscopic holography sensor and the beam directing assembly and is adapted to adjustably position the carriage. The camera is positioned proximate to the carriage and is adapted to receive the laser beam from the beam directing assembly and to transmit a corresponding image signal to the processor which, in turn, transmits a corresponding calibration signal to the control assembly. In one particular embodiment, the positioning assembly includes a three axis stage that provides position control along first, second, and third directions. The calibration control signal allows proper calibration of the conoscopic holography sensor prior to making actual measurements.

BRIEF DESCRIPTION OF THE DRAWINGS

Preferred and alternative embodiments of the present invention are described in detail below with reference to the following drawings.

FIG. 5 is an enlarged, side cross-sectional schematic view of a conoscopic holography sensor of the data acquisition assembly of FIG. 2.

DETAILED DESCRIPTION OF THE INVENTION

The present invention relates to measuring or otherwise analyzing characteristics of a workpiece using conoscopic holography. While details of certain embodiments are described and shown, other embodiments may be used, including some embodiments that omit some details from the embodiments that we choose to describe as representative of the present invention.

Figure 1:
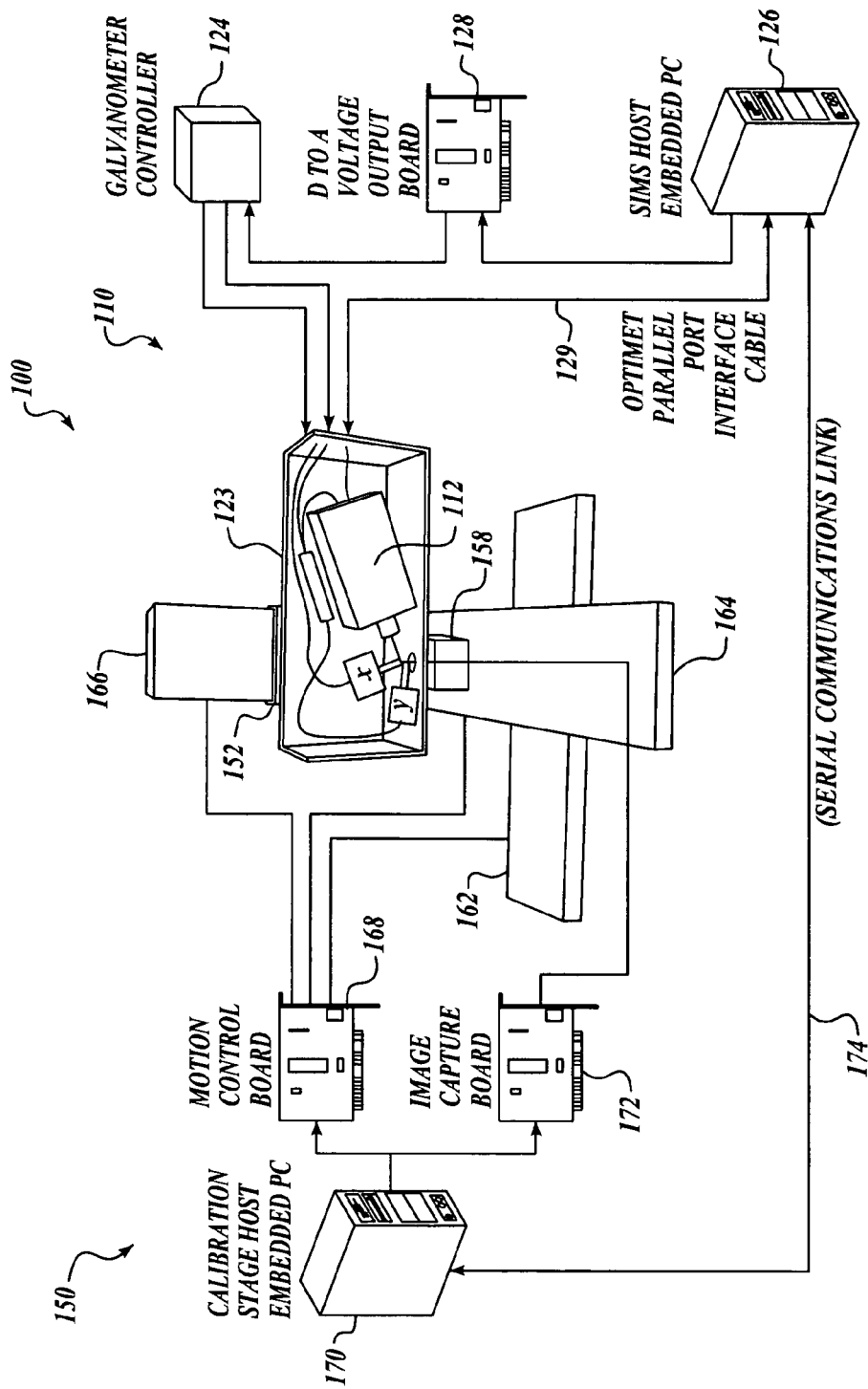
FIG. 1 is a schematic view of a measurement system in accordance with an embodiment of the present invention.

FIG. 1 is a schematic view of a measurement system 100 in accordance with one embodiment that includes a data acquisition assembly 110 and a calibration assembly 150. The data acquisition assembly 110 performs measurements on a workpiece, while the calibration assembly 150 enables the proper calibration of the data acquisition assembly 110. Embodiments of systems and methods in accordance with the present invention may be used to perform measurements of a variety of physical characteristics of the workpiece, including, for example, angles, distances, roughness, scratches, hole diameters and other hole characteristics, and a wide variety of other desired measurements.

Figure 2:
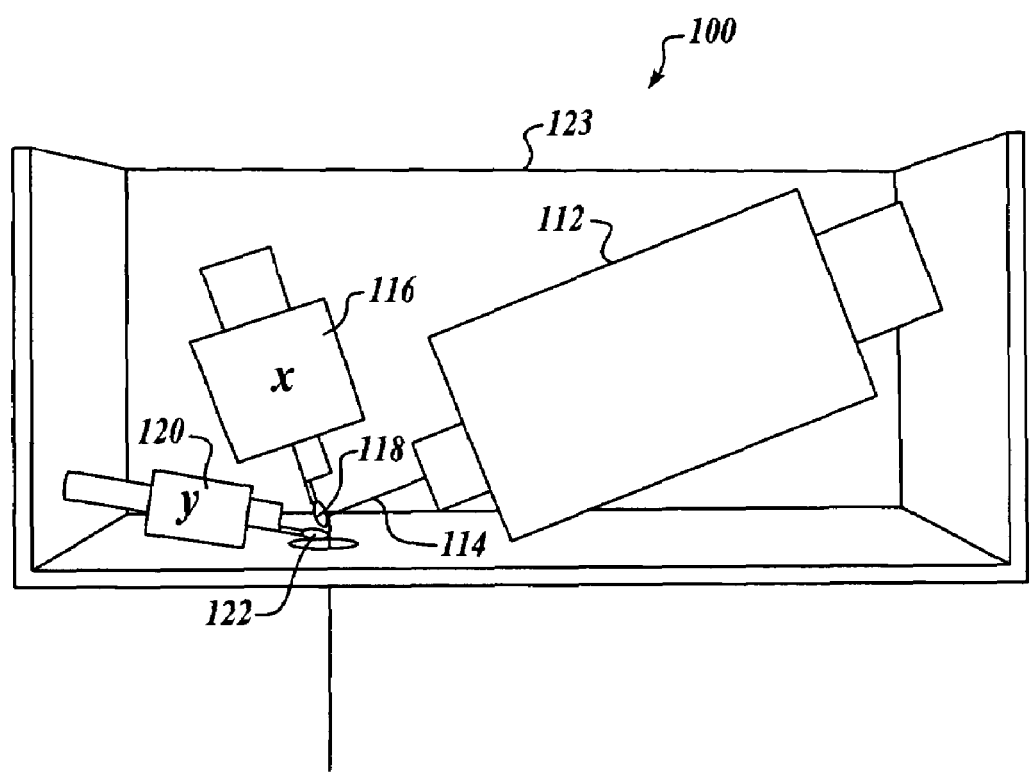
FIG. 2 is an enlarged, side elevational view of a data acquisition assembly of the measurement system of FIG. 1.
Figure 3:
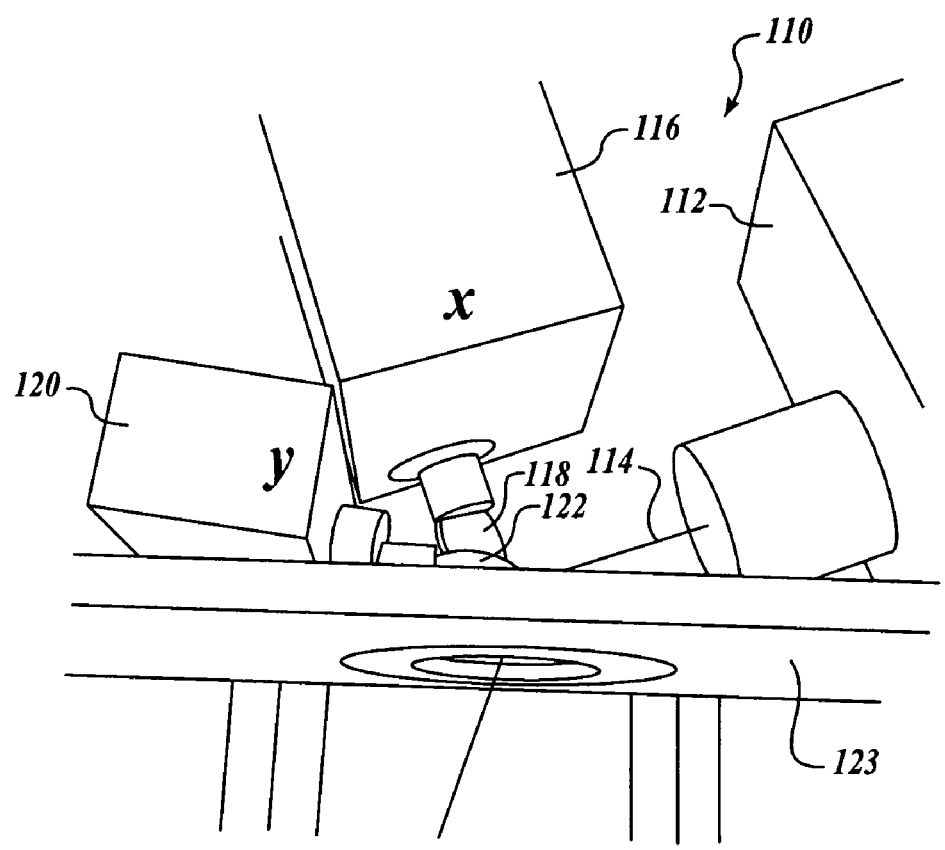
FIG. 3 is an enlarged, lower isometric view of the data acquisition assembly of FIG. 2.

FIGS. 2 and 3 are enlarged, partial elevational and isometric views of the data acquisition assembly 110 of FIG. 1, comprising a scanning conoscopic holography sensor 112 that projects a laser beam 114 onto a workpiece (not shown). A first galvanometer 116 is coupled to a first mirror 118, and a second galvanometer 120 is coupled to a second mirror 122. In some embodiments, the mirrors and galvanometers may be integrated as an assembly, such as those assemblies commercially-available from Cambridge Technology, Inc. of Cambridge, Mass. As best shown in FIG. 1, a galvanometer controller 124 is operatively coupled to the first and second galvanometers 116, 120, and can adjust each galvanometer separately or both simultaneously. A data acquisition computer 126 is coupled to the galvanometer controller 124 via an output board 128, and is also coupled to the sensor 112 by an interface cable 129.

The mirrors 118, 122 typically rotate in different planes. The geometry of these planes is usually application specific and may be important to the success of the overall design of the system. For example, in one particular embodiment, there may be a specific spatial orientation of the mirrors 118, 122 that works best for measurement of holes. Design constraints include minimizing the distance between the two mirrors and maximizing the return light aperture at all required mirror angles. Mirrors may be selected versus linear stages due to their speed, accuracy, weight, and size advantage. Alternately, a four or five axis stage may be required to perform the work of two mirrors. Additionally, the use of mirrors is typically desired for a portable, battery-powered configuration of the invention.

Figure 4:
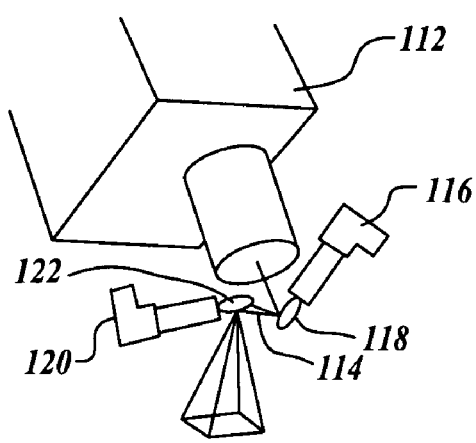
FIG. 4 is an isometric schematic view of the scanning conoscopic holography sensor of FIG. 1 in operation.

In operation, a control signal from the data acquisition computer 126 is transmitted to the sensor 112, causing the sensor 112 to emit the laser beam 114. The laser beam 114 is directed onto the first mirror 118, reflects onto the second mirror 122, and impinges onto the workpiece. FIG. 4 is an isometric schematic view of the sensor 112 in operation with the first and second mirrors 118, 122 and the first and second galvanometers 116, 120. After impinging on the workpiece, at least a portion 135 (FIG. 5) of the laser beam 114 is reflected from the workpiece, and retraces its original path back to the scanning conoscopic holography sensor 112. One or more additional control signals are transmitted from the data acquisition computer 126 to the galvanometer controller 124. The galvanometer controller 124 receives the additional control signals and controllably positions the first and second galvanometers 116, 120 which, in turn, controllably adjusts the positions of the first and second mirrors 118, 122, respectively. By controllably adjusting the positions of the first and second mirrors 118, 122, the sensor 112 acquires the reflected portion 135 (FIG. 5) of the laser beam and transmits corresponding signals to the data acquisition computer 126 to perform the desired measurements on the workpiece, as described more fully below. The corresponding signals transmitted to the data acquisition computer 126 may be a post-processed signal, or alternately, may be the actual reflected portion 135 of the laser beam.

FIG. 5 shows the sensor 112 where a laser diode 130 that emits an initial laser beam 132 onto a beam splitter 134. At least a portion of the initial laser beam 132 is reflected through an adaptation objective 136 and through a lens assembly 138 toward the first and second mirrors 118, 122, and ultimately, onto the workpiece 140. Scattered light reflected from the workpiece 140 is received through the lens assembly 138 and the beam splitter 136, and passes through a sharpening objective 142 and a conoscopic module 144 that includes a birefringent crystal before impinging on a CCD camera 146. In one particular embodiment, the scanning conoscopic holography sensor 112 shown in FIG. 5 is an Optimet Conoprobe Sensor commercially-available from Optimet Metrology Ltd. of Jerusalem, Israel. In alternate embodiments, of course, any other suitable type of scanning conoscopic holography sensor may be used.

The birefringent crystal of the conoscopic module 144 modifies the speed of each light ray of the reflected portion 135 of the laser beam differently in accordance with its angle. This creates a high contrast fringe pattern 148 on the CCD camera 146. The angle of the light ray is a function of the distance between a reference plane and the laser spot projected on the workpiece 140. In the presently preferred embodiment, the sensor 112 performs the analysis and determination of the distances (or measurements) of interest, however, in alternate embodiments, these analyses may be performed by other suitable components of the system 100, including, for example, the data acquisition computer 126. This analysis may be performed as the sensor 112 scans the surface of the workpiece under measurement, or may be performed in a post-processing manner.

More specifically, in one particular embodiment, the data acquisition assembly 110 is adapted to measure the linear distance to at least one point on a surface of the workpiece 140, and report back that distance via the data acquisition computer 126. The scanning conoscopic holography sensor 112 may, in one embodiment, acquire 10,000 distance measurements per second. As noted above, the output laser beam 114 from the sensor 112 is directed at the first mirror 118 which is mounted on the first galvanometer 116. The laser beam 114 reflects off the first mirror 118 and then strikes the second mirror 122. The second mirror 122 is also under positional control via the second galvanometer 120. In one particular embodiment, both the first and second galvanometers 116, 118 can be controlled to rotate to any position within an approximately 40° range, respectively. The net result is that the laser beam 114 exits in a controlled vector direction over a desired range of angles in the X, Y, and Z directions.

In one particular embodiment, the galvanometer controller 124 responds to the DC input voltage in the range from −10 VDC to +10 VDC and proportionately rotates the output shafts of the first and second galvanometers 116, 120 (and the first and second mirrors 118, 122) to the desired angle. The output board 128 may be a 16-bit digital-to-analog DC voltage output board (D to A board) that generates the desired DC input voltage to the galvanometer controller 124.

Application software running on the data acquisition computer 126 programmatically controls the input voltages to the first and second galvanometers 116, 120. The application software can generate any scanning pattern such as a circular path (for measurement of hole diameter) or a raster scan (for measurement of surface defects). The application software may communicate with the sensor 112 through a parallel port of the data acquisition computer 126 via the interface cable 129. The application software regulates the amount of power to the sensor 112 depending on the surface reflectivity and angle of incidence. The application software triggers the acquisition of the measurements of the sensor 112 and correlates those measurements with the X and Y positions of the first and second mirrors 118, 122. The application software computes the three dimensional position of each measurement point on the workpiece 140. A "cloud" of measurement points is further reduced to the desired dimensional measurement, such as the diameter of a hole or the depth of surface scratch.

Embodiments of data acquisition systems in accordance with the present invention provide significant advantages over the prior art. For example, the data acquisition assembly 110 is capable of performing accurate measurements on highly reflective surfaces, including aluminum. The data acquisition assembly 110 can also measure at very high angles of incidence (e.g. for measurement of deep holes). The data acquisition assembly 110 may have a larger range-to-precision ratio than prior art devices, and the precision, range, and spot size may be adjusted by changing objective lenses within the lens assembly 138, allowing for greater versatility from the same device. Data acquisition systems in accordance with the present invention may also be less affected by dirt or debris in the return path of the measurement beam 114. Furthermore, since the transmitted and received paths of the laser beam 114 or coaxial, the beam can be steered with planar mirrors. Embodiments of data acquisition systems in accordance with the present invention may also reduce assumptive errors in the measurement process, and may greatly reduce the number of specialized measurement gauges required to perform manufacturing and assembly processes of large, relatively complex structures, including commercial aircraft and the like.

Embodiments of the present invention are expected to provide measurement accuracies of hole diameter to within 0.0002 inches. In optical systems, a single point accuracy may be worse than a surface-averaged accuracy, and thus, many more points than just the two located at the ends of a particular diameter are desired. Other considerations, such as hole data alignment and reference surface measurement, further increase the desirability of measuring a greater number of points to achieve a desired measurement. Thus, the assumptive errors of traditional measurements, which tend to measure at a single contact point, are reduced by the present invention since it is capable of measuring surfaces and involves an analysis that is typically more thorough than the prior art.

Figure 6:
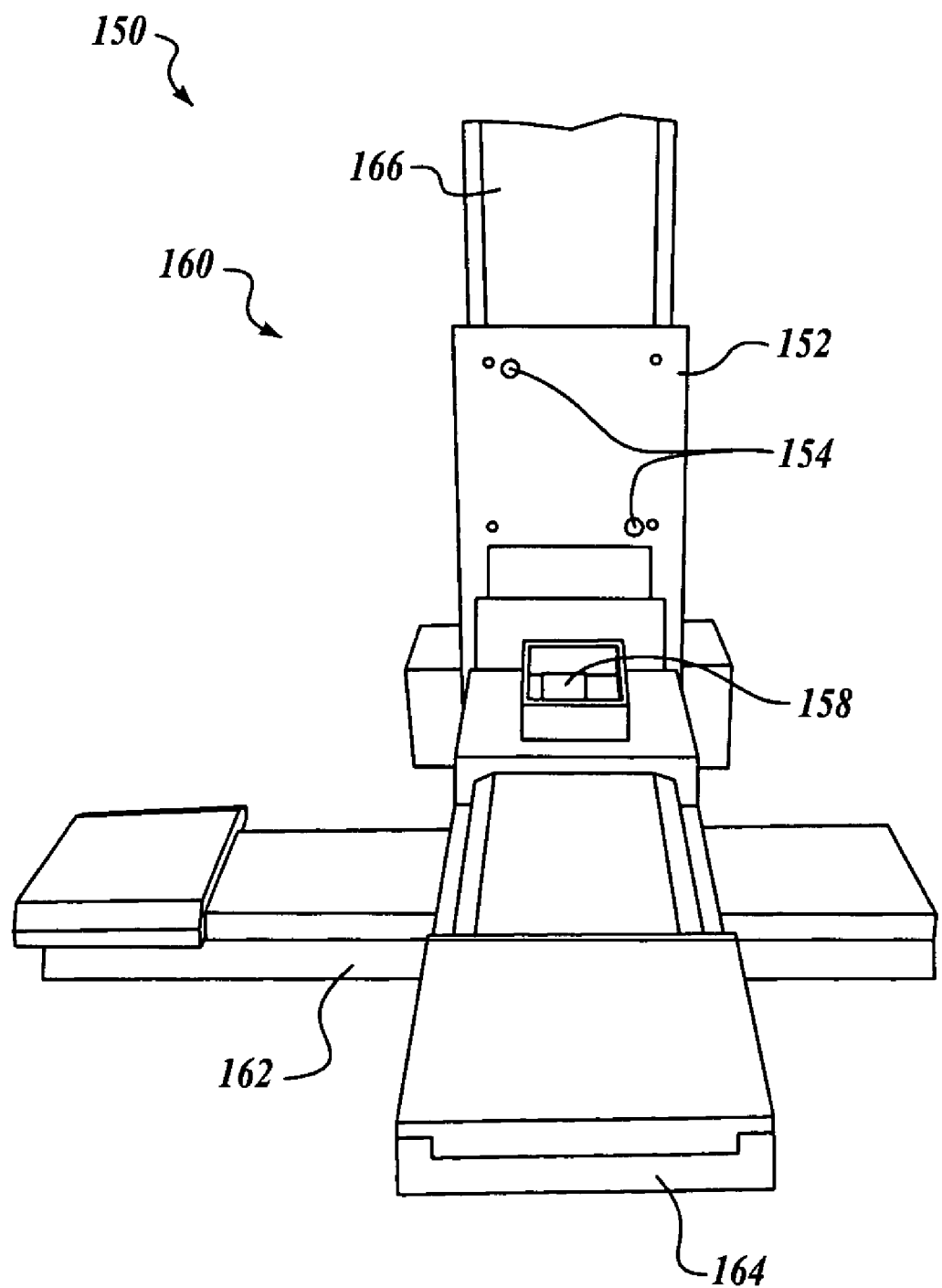
FIG. 6 is an upper isometric view of a calibration assembly of the measurement system of FIG. 1.

FIG. 6 is an upper isometric view of the calibration assembly 150 of the measurement system 100 of FIG. 1. In this embodiment, the calibration assembly 150 includes a carriage 152 mounted on a three axis stage 160. Index pins 154 are provided on the carriage 152 for mounting at least a portion of the data acquisition assembly 110 to, the three axis stage 160. For example, in the embodiment shown in FIGS. 2 and 3, the scanning conoscopic holography sensor 112, the first and second galvanometers 116, 120 and the first and second mirrors 118, 122 are attached to a sensor platform 123 that is, in turn, coupled to the carriage 152 via the index pins 154. As further shown in FIG. 6, the three axis stage 160 includes a first (or X) axis rail 162, a second (or Y) axis rail 164, and a third (or Z) axis rail 166. A camera 158 (e.g. a CCD camera) is coupled to the three axis stage 160 proximate the carriage 152, and is adapted to receive the laser beam 114 emitted from the sensor 112.

Referring again to FIG. 1, the calibration assembly 150 further includes a calibration computer 170 operatively coupled to the first, second, and third axis rails 162, 164, 166 via a motion control board 168 (FIG. 1). The calibration computer 170 is also coupled to the camera 158 through an image capture board 172, and to the data acquisition computer 126 by a communications link 174.

Figure 7:
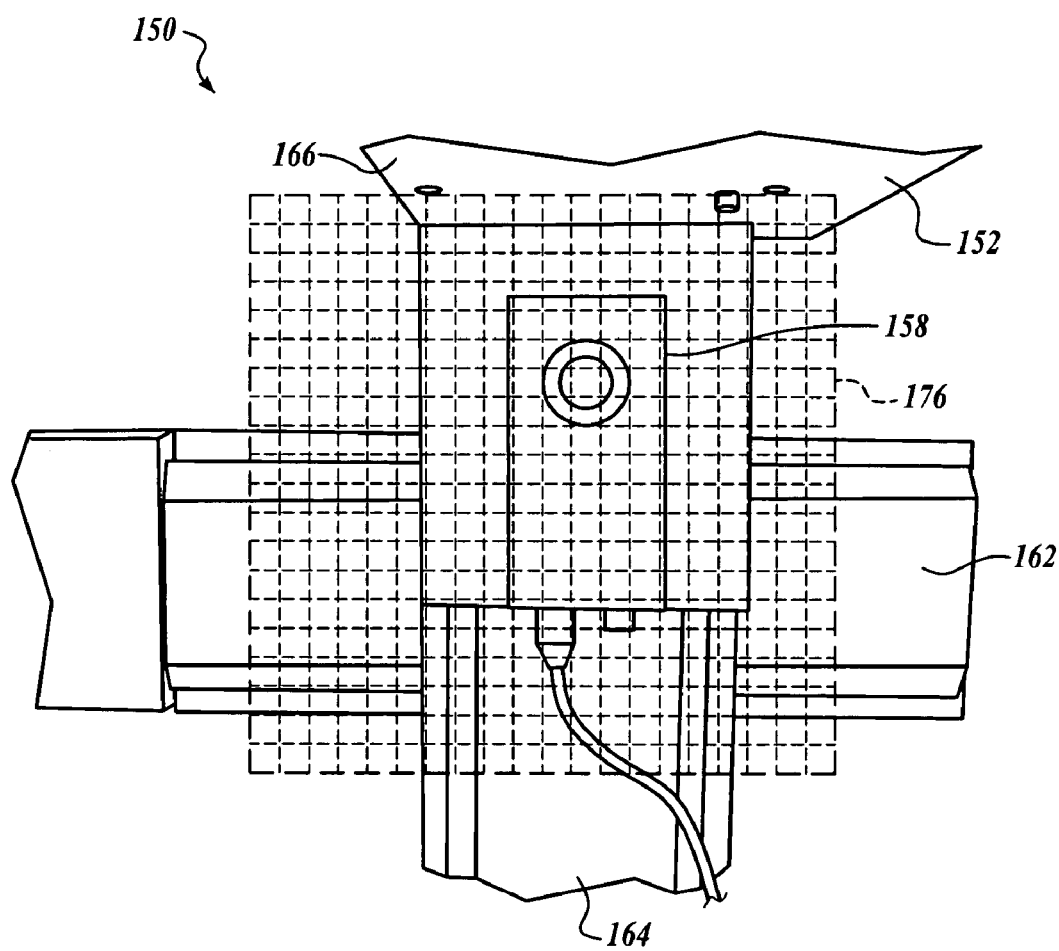
FIG. 7 is a top elevational view of a grid overlaid on the calibration assembly of FIG. 6.

In operation, the three axis stage 160 and the camera 158 of the calibration assembly 150 are integrated to form a detection area 176 sufficiently large enough to measure and calibrate the measurement range of the data acquisition assembly 110. FIG. 7 is a top elevational view of the detection area (or grid) 176 overlaid on a portion of the calibration assembly 150 of FIG. 5. Control signals from the calibration computer 170 (FIG. 1) are transmitted through the motion control board 168 to controllably position the first, second, and third axis rails 162, 164, 166, and thus, the positions of the carriage 152 and the camera 158. Similarly, the data acquisition computer 126 drives the mirrors 118, 122 and the sensor 112 using test voltages, and the camera 158 reports a spot centroid position of the laser beam 114. The spot centroid position is reported back to the data acquisition computer 126 through the image capture board 172 of the calibration computer 170. The camera 158 is movable throughout the detection area 176 using the three axis stage 160 (i.e. in this embodiment, using the first and second axis rails 162, 164) to enable calibration of the data acquisition assembly 110 over a larger effective area. The detection area (or grid) 1176 illustrates the original digital camera chip sensitive area and that area expanded by use of the stage 160 to produce a much larger effective sensitive area.

After each test input voltage has been commanded from the data acquisition computer 126, the calibration assembly 150 acquires the spot centroid location of the laser beam 114 using the camera 158 and saves the location. This process may be repeated over the entire voltage range of the first and second (or X and Y) galvanometers 116, 120, and for several reference heights along for third (or Z) axis rail 166. The calibration computer 170 may then collect the test data consisting of spot centroid position as a function of galvanometer control voltages, and may return the vector-based equations that defined the required galvanometer control voltages to measure and desired position in a three-dimensional space. These calibration data are then returned and stored in the data acquisition computer 126 of the data acquisition assembly 110.

In one embodiment, a data fitting process for characterizing the test data may include two main components. In a first main component, given a set of unorganized (e.g non-gridded) input data (x,y,z) in 3-dimensional space, and a corresponding set of data (u,v) in 2-dimensional space, a function f(x,y,z)=(u,v) may be constructed that will give (u,v) for any (x,y,z). In a presently preferred embodiment, the (u,v) are the x axis and y axis galvanometers control voltages, and the (x,y,z) are the spot centroid positions mentioned above. One way to proceed involves using a data fitting method from 3-dimensional space to 2-dimensional space.

Alternately, methods for fitting data from 2-dimensional space to 3-dimensional space may be used, and then an inverse may be calculated. More specifically, a conventional software routine may be applied to the 2-dimensional data to construct a function g(u,v)=(x,y,z). Typically, such routines may employ tensor-product spline functions and may involve choosing "knots" which may, for example, be placed uniformly at the data points. Next, the inverse of g may be constructed by using a closest-point operation. That is, given a point (x,y,z), the corresponding (u,v) may be calculated by projecting (x,y,z) onto g, and then the inverse of g gives the desired function.

In a further embodiment of the invention, additional calibration testing may be performed to measure the laser beam path distance to a flat reference surface as the first and second mirrors 118, 122 are rotated. More specifically, as the mirrors 118, 122 rotate, there is a change in the distance that it takes the laser beam 114 to pass through the mirrors 118, 122. It may be desirable to measure and compensate for this change in distance to avoid or reduce systematic measurement errors.

In yet another embodiment of the invention, additional calibration testing may be performed to determine the optical parallax of a filter of the camera 158 that may cause an error between measured and actual spot centroid position of the laser beam 114. In the corresponding data reduction process, the input data are in 3-dimensional space (i.e. x axis galvanometer control voltage, y axis galvanometer control voltage, and laser beam path distance), and corresponding data are in 1-dimensional space (i.e. the vertical distance from the SIMS to the reference surface). Accordingly, a similar approach may be used involving constructing a function from a 1-dimensional space to a 3-dimensional space, and taking its inverse using conventional software algorithms.

Alternate embodiments of measurement systems in accordance with the present invention may be conceived, and the invention is not limited to the particular embodiments described or shown in FIGS. 1-7. For example, the functions performed by the calibration computer 170 and the data acquisition computer 126 may be integrated into a single computer, eliminating the need for two computers. In another embodiment, the three axis stage 160, and the associated control components of the motion control board 168 and the calibration computer 170, may be incorporated into the data acquisition assembly 110 and may be used to controllably position the sensor 112 over the workpiece 140 for performing measurements thereon, essentially eliminating the camera 158 and the image capture board 172 from the system 100 shown in FIG. 1. Furthermore, for more limited measurement applications, the three axis stage 160 may be replaced by a two axis or even a single axis position control system.

Figure 8:
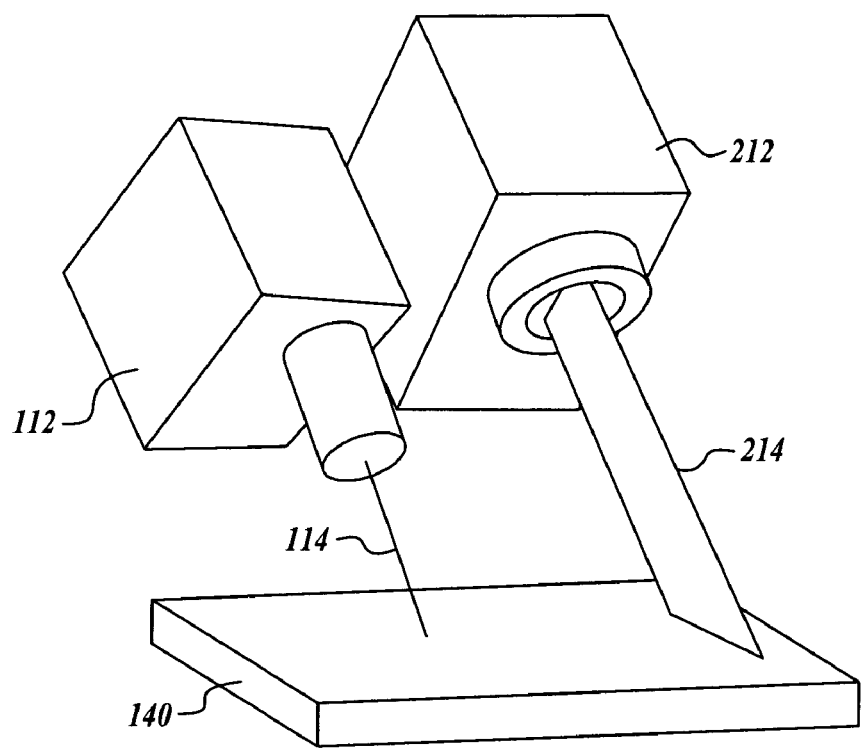
FIG. 8 is an isometric view of a pair of conoscopic holography sensors that may be employed in measurement system in accordance with alternate embodiments of the invention.

In other alternate embodiments, the particular conoscopic holography sensor 112 described above may be replaced with a sensor capable of measuring a plurality of points rather than a single point measurement. FIG. 8 is an isometric view of the conoscopic holography sensor 112 of FIGS. 1-5, as well as a conoscopic holography line sensor 212 that may be used in a measurement system in accordance with an alternate embodiment of the invention. In this embodiment, a sheet of laser light 214 is directed onto the workpiece 140, enabling the measurement of distances from the sensor 214 to the workpiece 140 along an entire line. In one particular embodiment, the conoscopic holography line sensor 212 is a model commercially-available from Optimet Metrology Ltd. and is capable of recording distance measurements at a rate of 18,000 points per second.

Embodiments of systems and methods in accordance with the present invention may be used to perform a wide variety of different measurements. For example, measurement systems in accordance with the present invention may be used to measure angles and distances, micro-surface profiles for roughness and scratches, hole diameters and hole bores, runout, cylindricity, coaxiality of mating parts, hole angularity of various diameters, surface-to-surface mismatch of two adjacent components, depth and flushness of countersunk holes, countersink depth, protrusions of bolts and nuts after installation, ovality and taper of holes, height of tubing bead, bead height of sealant fillets, radii of machined surfaces, radius undercuts, and a wide variety of other desired measurements. Thus, the number of specialized, single-purpose gauges needed during the manufacture and assembly of large, relatively-complex structures, and the costs associated therewith, may be reduced. Furthermore, the accuracy of manufacturing and assembly processes may be improved in comparison with the prior art, reducing labor and expenses associated with part rejections, reworking, and waste.

Figure 9:
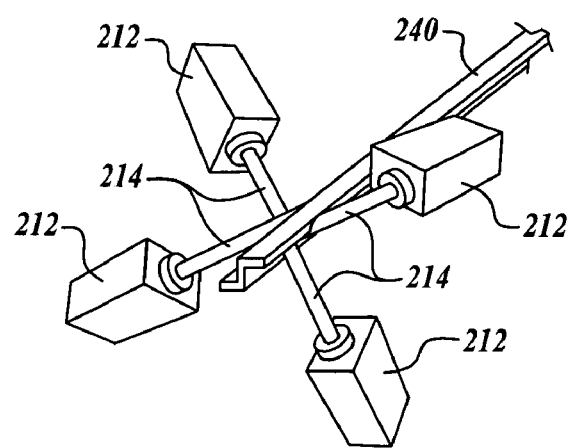
FIG. 9 is an isometric view of four conoscopic holography line sensors arranged for analyzing a workpiece in accordance with another embodiment of the invention.

In another particular embodiment, a measurement system in accordance with the present invention may be used to provide a complete three dimensional mapping of a workpiece. For example, FIG. 9 is an isometric view of a plurality of conoscopic holography line sensors 212 performing an analysis of a workpiece 240 in accordance with another embodiment of the invention. A plurality of line sensors 212 are distributed around the workpiece 240, with a sheet of laser light 214 from each line sensor 212 directed onto a portion of the workpiece 240. In some embodiments, the specific orientation of the line sensors 212 may be dependent upon the characteristics (e.g. cross-sectional shape) of the workpiece 240. By moving the workpiece 240 relative to the line sensors 212 (e.g. by mounting the line sensors 212 on a rolling frame), a three-dimensional surface scan of the workpiece 240 may be performed.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system for performing a measurement of a physical characteristic of a workpiece, comprising:
    a conoscopic holography sensor configured to emit a laser beam;
    a beam directing assembly configured to adjustably direct the laser beam toward the workpiece, and to adjustably direct a reflected light from the workpiece into the conoscopic holography sensor, wherein the conoscopic holography sensor includes a crystal configured to transmit the reflected light to form a fringe pattern at least partially indicative of the physical characteristic, wherein the beam directing assembly includes:
        a first mirror operatively coupled to a first galvanometer and being controllably adjustable to direct the laser beam alone a first axis; and
        a second mirror operatively coupled to a second galvanometer and being controllably adjustable to direct the laser beam along a second axis; and
    a control assembly operatively coupled to the conoscopic holography sensor and to the beam directing assembly, the control assembly being configured to send a first control signal to the conoscopic holography sensor to initiate the emission of the laser beam, and a second control signal to the beam directing assembly to controllably adjust a direction of the laser beam.

2. The system of claim 1, wherein the conoscopic holography sensor includes at least one of a single point conoscopic holography sensor and a line conoscopic holography sensor.

3. The system of claim 1, wherein the conoscopic holography sensor includes:
    a laser configured to emit an initial laser beam;
    a beam splitter configured to reflect at least a portion of the initial laser beam;
    a lens assembly including an adaptation objective operatively positioned to transmit the reflected portion of the laser beam toward the workpiece, and to transmit the reflected light from the workpiece onto the beam splitter, the beam splitter being further configured to transmit the reflected light; and a camera configured to receive the fringe pattern and transmit a corresponding data signal to the control assembly.

4. The system of claim 1, wherein the control assembly includes a galvanometer controller operatively coupled to the beam directing assembly, the galvanometer controller configured to transmit the second control signal to at least one of the first and second galvanometers.

5. The system of claim 1, wherein the crystal comprises a birefringent crystal.

6. A system for performing a measurement of a physical characteristic of a workpiece, comprising:

a conoscopic holography sensor configured to emit a laser beam;

a beam directing assembly configured to adjustably direct the laser beam toward the workpiece, and to adjustably direct a reflected light from the workpiece into the conoscopic holography sensor; and a control assembly operatively coupled to the conoscopic holography sensor and to the beam directing assembly, the control assembly being configured to send a first control signal to the conoscopic holography sensor to initiate the emission of the laser beam, and a second control signal to the beam directing assembly to controllably adjust a direction of the laser beam, wherein the control assembly includes a positioning assembly having a carriage operatively coupled to at least one of the conoscopic holography sensor and the beam directing assembly, the positioning assembly being configured to adjustably position the carriage.

7. The system of claim 6, wherein the positioning assembly is adapted to receive a third control signal from the control assembly and to adjustably position the carriage in response thereto.

8. The system of claim 6, wherein the positioning assembly includes at least one rail member, the carriage being controllably positionable along the rail member.

9. The system of claim 6, wherein the positioning assembly includes a three axis stage having a first rail member extending along a first direction, a second rail member extending along a second direction, and a third rail member extending along a third direction, the carriage being controllably positionable along the first, second, and third directions.

10. A system for performing a measurement of a physical characteristic of a workpiece, comprising:

a conoscopic holography sensor configured to emit a laser beam;

a beam directing assembly configured to adjustably direct the laser beam toward the workpiece, and to adjustably direct a reflected light from the workpiece into the conoscopic holography sensor;

a control assembly operatively coupled to the conoscopic holography sensor and to the beam directing assembly, the control assembly being configured to send a first control signal to the conoscopic holography sensor to initiate the emission of the laser beam, and a second control signal to the beam directing assembly to controllably adjust a direction of the laser beam; and a calibration assembly operatively coupled to at least one of the conoscopic holography sensor and the beam directing assembly, the calibration assembly including:

a positioning assembly having a carriage operatively coupled to at least one of the conoscopic holography sensor and the beam directing assembly, the positioning assembly being configured to adjustably position the carriage;

a camera configured to receive the laser beam from the beam directing assembly; and a processor configured to receive an image signal from the camera and to transmit a corresponding calibration signal to the control assembly.

11. The system of claim 10, wherein the positioning assembly includes at least one rail member, the carriage being controllably positionable along the rail member.

12. The system of claim 10, wherein the positioning assembly includes a three axis stage having a first rail member extending along a first direction, a second rail member extending along a second direction, and a third rail member extending along a third direction, the positioning assembly being adapted to receive a third control signal from the control assembly and to adjustably position the carriage along at least one of the first, second, and third directions in response thereto.

13. The system of claim 12, wherein the carriage is coupled to a first one of the rail members and the camera is coupled to a second one of the rail members, the positioning assembly being further adapted to receive a fourth control signal from the control assembly and to adjustably position the camera along at least one of the first, second, and third directions in response thereto.

14. A system for performing a measurement of a physical characteristic of a workpiece, comprising:

a conoscopic holography sensor configured to emit a laser beam;

a beam directing assembly configured to adjustably direct the laser beam toward the workpiece, and to adjustably direct a reflected light from the workpiece into the conoscopic holography sensor, wherein the conoscopic holography sensor includes a crystal configured to transmit the reflected light to form a fringe pattern at least partially indicative of the physical characteristic, and wherein the beam directing assembly includes a first mirror operatively coupled to a first galvanometer configured to controllably direct the laser beam along a first axis, and a second mirror operatively coupled to a second galvanometer configured to controllably direct the laser beam along a second axis; and a control assembly operatively coupled to the conoscopic holography sensor and to the beam directing assembly, the control assembly being configured to send a first control signal to the conoscopic holography sensor to initiate the emission of the laser beam, and a second control signal to the beam directing assembly to controllably adjust a direction of the laser beam.

15. A system for performing a measurement of a physical characteristic of a workpiece, comprising:

a conoscopic holography sensor configured to emit a laser beam;

a beam directing assembly configured to adjustably direct the laser beam toward the workpiece, and to adjustably direct a reflected light from the workpiece into the conoscopic holography sensor, wherein the beam directing assembly includes a first mirror operatively coupled to a first galvanometer configured to controllably direct the laser beam along a first axis, and a second mirror operatively coupled to a second galvanometer configured to controllably direct the laser beam along a second axis; and a control assembly operatively coupled to the conoscopic holography sensor and to the beam directing assembly, the control assembly being configured to send a first control signal to the conoscopic holography sensor to initiate the emission of the laser beam, and a second control signal to the beam directing assembly to controllably adjust a direction of the laser beam, wherein the control assembly includes a positioning assembly having a carriage operatively coupled to at least one of the conoscopic holography sensor and the beam directing assembly, the positioning assembly being configured to adjustably position the carriage.

16. A system for performing a measurement of a physical characteristic of a workpiece, comprising:
  a conoscopic holography sensor configured to emit a laser beam;
  a beam directing assembly configured to adjustably direct the laser beam toward the workpiece, and to adjustably direct a reflected light from the workpiece into the conoscopic holography sensor, wherein the beam directing assembly includes a first mirror operatively coupled to a first galvanometer configured to controllably direct the laser beam along a first axis, and a second mirror operatively coupled to a second galvanometer configured to controllably direct the laser beam along a second axis;
  a control assembly operatively coupled to the conoscopic holography sensor and to the beam directing assembly, the control assembly being configured to send a first control signal to the conoscopic holography sensor to initiate the emission of the laser beam, and a second control signal to the beam directing assembly to controllably adjust a direction of the laser beam; and
  a calibration assembly operatively coupled to at least one of the conoscopic holography sensor and the beam directing assembly, the calibration assembly including:
    a positioning assembly having a carriage operatively coupled to at least one of the conoscopic holography sensor and the beam directing assembly, the positioning assembly being configured to adjustably position the carriage;
    a camera configured to receive the laser beam from the beam directing assembly and to transmit a corresponding image signal; and
    a processor configured to receive the image signal and to transmit a corresponding calibration signal to the control assembly.

17. The system of claim 16, wherein the positioning assembly includes a three axis stage having a first rail member extending along a first direction, a second rail member extending along a second direction, and a third rail member extending along a third direction, the positioning assembly being adapted to receive a third control signal from the control assembly and to adjustably position the carriage along at least one of the first, second, and third directions in response thereto.

18. The system of claim 17, wherein the carriage is coupled to a first one of the rail members and the camera is coupled to a second one of the rail members, the positioning assembly being further adapted to receive a fourth control signal from the control assembly and to adjustably position the camera along at least one of the first, second, and third directions in response thereto.

19. A method for performing a measurement of a physical characteristic of a workpiece, comprising:
  emitting a laser beam;
  adjustably directing the laser beam toward the workpiece using a beam directing assembly including controllably directing the laser beam along a first axis using a first mirror operatively coupled to a first galvanometer and controllably directing the laser beam along a second axis using a second mirror operatively coupled to a second galvanometer;
  adjustably directing a reflected light from the workpiece through the beam directing assembly and into a conoscopic holography sensor, wherein the conoscopic holography sensor includes a crystal configured to transmit the reflected light to form a fringe pattern at least partially indicative of the physical characteristic; and
  analyzing the reflected light to determine the physical characteristic of the workpiece.

20. The method of claim 19, wherein adjustably directing the laser beam toward the workpiece using a beam directing assembly further includes transmitting a beam control signal to at least one of the first and second galvanometers.

21. The method of claim 19, wherein the crystal comprises a birefringent crystal, the method further comprising adjusting a position of at least one of the conoscopic holography sensor and the beam directing assembly relative to the workpiece.

22. The method of claim 19, wherein the crystal comprises a birefringent crystal, and wherein analyzing the reflected light includes analyzing the fringe pattern to determine the physical characteristic of the workpiece.

23. The method of claim 19, wherein emitting a laser beam includes emitting a laser beam from the conoscopic holography sensor adjustably directing the laser beam toward the workpiece using a beam directing assembly.

24. The method of claim 19, wherein adjustably directing the laser beam toward the workpiece using a beam directing assembly includes scanning the laser beam over the workpiece using the beam directing assembly.

25. A method for performing a measurement of a physical characteristic of a workpiece, comprising:
  emitting a laser beam;
  adjustably directing the laser beam toward the workpiece using a beam directing assembly;
  adjustably directing a reflected light from the workpiece though the beam directing assembly and into a conoscopic holography sensor;
  analyzing the reflected light to determine the physical characteristic of the workpiece; and
  adjusting a position of at least one of the conoscopic holography sensor and the beam directing assembly relative to the workpiece, wherein adjusting a position of at least one of the conoscopic holography sensor and the beam directing assembly relative to the workpiece includes:
    providing a positioning assembly having a carriage operatively coupled to at least one of the conoscopic holography sensor and the beam directing assembly; and
    controllably adjusting a position of the carriage.

26. The method of claim 25, wherein the positioning assembly includes at least one rail member, and wherein controllably adjusting a position of the carriage includes controllably adjusting a position of the carriage along the rail member.

27. The method of claim 25, wherein the positioning assembly includes a three axis stage having a first rail member extending along a first direction, a second rail member extending along a second direction, and a third rail member extending along a third direction, and wherein controllably adjusting a position of the carriage includes controllably adjusting a position of the carriage along at least one of the first, second, and third directions.

28. A method for performing a measurement of a physical characteristic of a workpiece, comprising:
   emitting a laser beam;
   adjustably directing the laser beam toward the workpiece using a beam directing assembly;
   adjustably directing a reflected light from the workpiece through the beam directing assembly and into a conoscopic holography sensor;
   analyzing the reflected light to determine the physical characteristic of the workpiece; and
   comparing an actual position of the laser beam with an anticipated position of the laser beam, including:
      providing a camera configured to receive the laser beam from the beam directing assembly;
      transmitting a control signal to the beam directing assembly to position the laser beam in the anticipated position;
      receiving the laser beam at the camera; and
      comparing the actual position of the laser beam determined by the camera with the anticipated position.

29. The method of claim 28, wherein transmitting a control signal to the beam directing assembly to position the laser beam in the anticipated position includes transmitting a control signal to a positioning assembly having a carriage operatively coupled to at least one of the conoscopic holography sensor and the beam directing assembly, the positioning assembly being adapted to adjustably position the carriage.

30. The method of claim 29, wherein transmitting a control signal to a positioning assembly includes transmitting a control signal to a positioning assembly that is adapted to receive a third control signal from the control assembly and to adjustably position the carriage in response thereto.

31. The method of claim 29, wherein transmitting a control signal to a positioning assembly includes transmitting a control signal to a positioning assembly that includes at least one rail member, the carriage being controllably positionable along the rail member.

32. The method of claim 29, wherein transmitting a control signal to a positioning assembly includes transmitting a control signal to a positioning assembly that includes a three axis stage having a first rail member extending along a first direction, a second rail member extending along a second direction, and a third rail member extending along a third direction, the positioning assembly being adapted to receive a third control signal from the control assembly and to adjustably position the carriage along at least one of the first, second, and third directions in response thereto.

33. The method of claim 32, wherein the carriage is coupled to a first one of the rail members and the camera is coupled to a second one of the rail members, the positioning assembly being further adapted to receive a fourth control signal from the control assembly and to adjustably position the camera along at least one of the first, second, and third directions in response thereto.

* * * * *